US009852732B2

(12) United States Patent
Chavez et al.

(10) Patent No.: US 9,852,732 B2
(45) Date of Patent: Dec. 26, 2017

(54) SYSTEM AND METHOD FOR NEAR REAL-TIME IDENTIFICATION AND DEFINITION QUERY

(75) Inventors: David L. Chavez, Broomfield, CO (US); Larry J. Hardouin, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 961 days.

(21) Appl. No.: 12/899,683

(22) Filed: Oct. 7, 2010

(65) Prior Publication Data

US 2012/0089395 A1   Apr. 12, 2012

(51) Int. Cl.
*G06F 17/27* (2006.01)
*G06F 17/21* (2006.01)
*G10L 15/26* (2006.01)
*G06F 17/30* (2006.01)

(52) U.S. Cl.
CPC .......... *G10L 15/26* (2013.01); *G06F 17/2735* (2013.01); *G06F 17/2795* (2013.01); *G06F 17/3064* (2013.01)

(58) Field of Classification Search
CPC ............. G06F 17/2795; G06F 17/2735; G06F 17/3064; G06F 17/30672
USPC ...... 704/1–10, 231–245, 251–255, 270–271, 704/276, E15.001–E15.05, 704/E11.001–E11.007; 379/67.1, 379/88.01–88.28
See application file for complete search history.

(56) References Cited

U.S. PATENT DOCUMENTS

| | | | | |
|---|---|---|---|---|
| 5,027,406 | A * | 6/1991 | Roberts et al. | 704/244 |
| 5,526,259 | A * | 6/1996 | Kaji | 704/3 |
| 5,634,084 | A * | 5/1997 | Malsheen | G06F 17/273 |
| | | | | 704/260 |
| 6,922,809 | B2 * | 7/2005 | Coden et al. | 715/267 |
| 7,257,531 | B2 * | 8/2007 | Holub | 704/235 |
| 7,283,951 | B2 * | 10/2007 | Marchisio et al. | 704/9 |
| 7,383,172 | B1 * | 6/2008 | Jamieson | 704/9 |
| 7,844,460 | B2 * | 11/2010 | Charlier et al. | 704/257 |
| 8,060,565 | B1 * | 11/2011 | Swartz | 709/206 |
| 2002/0094512 | A1 * | 7/2002 | Bhogal et al. | 434/169 |
| 2002/0191757 | A1 * | 12/2002 | Belrose | 379/88.13 |
| 2003/0078784 | A1 * | 4/2003 | Jordan et al. | 704/275 |
| 2004/0030704 | A1 * | 2/2004 | Stefanchik et al. | 707/100 |
| 2004/0243388 | A1 * | 12/2004 | Corman et al. | 704/1 |
| 2005/0283364 | A1 * | 12/2005 | Longe et al. | 704/257 |
| 2006/0149558 | A1 * | 7/2006 | Kahn et al. | 704/278 |
| 2008/0201142 | A1 * | 8/2008 | Charlier et al. | 704/235 |

(Continued)

OTHER PUBLICATIONS

Roche, Mathieu, and Violaine Prince. "Managing the Acronym/Expansion Identification Process for Text-Mining Applications." Int. J. Software and Informatics 2.2 (2008): 163-179.*

*Primary Examiner* — Jialong He

(57) ABSTRACT

A method of operating a communication system includes generating a transcript of at least a portion of a conversation between a plurality of users. The transcript includes a plurality of subsets of characters. The method further includes displaying the transcript on a plurality of communication devices, identifying an occurrence of at least one selected subset of characters from the plurality of subsets of characters, and querying a definition source for at least one definition for the selected subset of characters. The definition for the selected subset of characters is displayed on the plurality of communication devices.

18 Claims, 3 Drawing Sheets

(56) References Cited

U.S. PATENT DOCUMENTS

| | | | |
|---|---|---|---|
| 2008/0221893 A1* | 9/2008 | Kaiser | 704/257 |
| 2009/0063134 A1* | 3/2009 | Gallagher et al. | 704/10 |
| 2009/0112600 A1* | 4/2009 | Gilbert et al. | 704/270.1 |
| 2010/0106497 A1* | 4/2010 | Phillips | 704/231 |
| 2010/0142684 A1* | 6/2010 | Chang et al. | 379/88.14 |
| 2010/0158213 A1* | 6/2010 | Mikan et al. | 379/88.14 |
| 2010/0318356 A1* | 12/2010 | Hamaker et al. | 704/251 |
| 2011/0013756 A1* | 1/2011 | Davies et al. | 379/88.14 |
| 2011/0043652 A1* | 2/2011 | King et al. | 348/222.1 |
| 2011/0208816 A1* | 8/2011 | Chavez | 709/206 |
| 2012/0035932 A1* | 2/2012 | Jitkoff et al. | 704/254 |
| 2012/0089395 A1* | 4/2012 | Chavez et al. | 704/235 |
| 2012/0330648 A1* | 12/2012 | Boguraev | G06F 17/2735 704/9 |

\* cited by examiner

SYSTEM AND METHOD FOR NEAR REAL-TIME IDENTIFICATION AND DEFINITION QUERY

TECHNICAL BACKGROUND

In the rapidly changing field of telecommunications, non-traditional phone products are increasing in popularity. Voice over Internet Protocol (VoIP) phone calling is one example that both enterprise class and residential class consumers enjoy in ever larger numbers due to its affordability and features. In addition to voice calling, VoIP products frequently provide chat and video calling capabilities.

Though these advances facilitate a broad range of communications, as in most conversations, activities such as word spotting, acronym detection, and other term recognition may still remain difficult. One approach to facilitate these processes is the use of text to speech (TTS) in which audible speech is converted to text. Such a process can allow for word spotting and the like. While such a process can show users the words in the conversation, this approach does nothing to help clarify the meaning of an unfamiliar word, acronym or term used in the conversation.

Presently, in order to ascertain a meaning of a word or term in a conversation, a user is required to interrupt the flow of the call to ask the definition and context if needed. Alternatively, the user can conduct an internet search on a computer, assuming that one is readily available, to attempt to learn the meaning. Though useful in obtaining a definition, this requires a separate device or application while distracting from the phone call.

The problem becomes worse when there are more than two parties involved in the telephone call, e.g., in a conferencing situation. The problem is also worsened by a scientific, technical, legal or other environment where there are words, acronyms, and/or terms that are not common parlance. Still another aspect of the problem is when there are multiple definitions of a word, acronym and/or term and in order to select one, the user needs to provide the appropriate context for the search.

Overview

In one example, a method of operating a communication system includes generating a transcript of at least a portion of a conversation between a plurality of users. The transcript includes a plurality of subsets of characters. The method further includes displaying the transcript on a plurality of communication devices, identifying an occurrence of at least one selected subset of characters from the plurality of subsets of characters and querying a definition source for at least one definition for the selected subset of characters. The definition for the selected subset of characters is displayed on the plurality of communication devices.

In another example, a communication system includes a server configured to generate a transcript of at least a portion of a conversation between a plurality of users over a network. The transcript includes a plurality of subsets of characters. The system also includes a plurality of communication devices configured to receive the transcript from the server and to display the transcript. At least one of the communication devices is configured to receive input to identify an occurrence of at least one selected subset of characters from the plurality of subsets of characters. The server is further configured to query a definition source for at least one definition for the selected subset of characters. The communication devices are configured to display the definition for the selected subset of characters.

In still another example, a computer readable medium has instructions stored thereon, that when executed perform a method. The method includes the steps of includes generating a transcript of at least a portion of a conversation between a plurality of users. The transcript includes a plurality of subsets of characters. The method further includes displaying the transcript on a plurality of communication devices, identifying an occurrence of at least one selected subset of characters from the plurality of subsets of characters, and querying a definition source for at least one definition for the selected subset of characters. The definition for the selected subset of characters is displayed on the plurality of communication devices.

DETAILED DESCRIPTION

Figure 1:
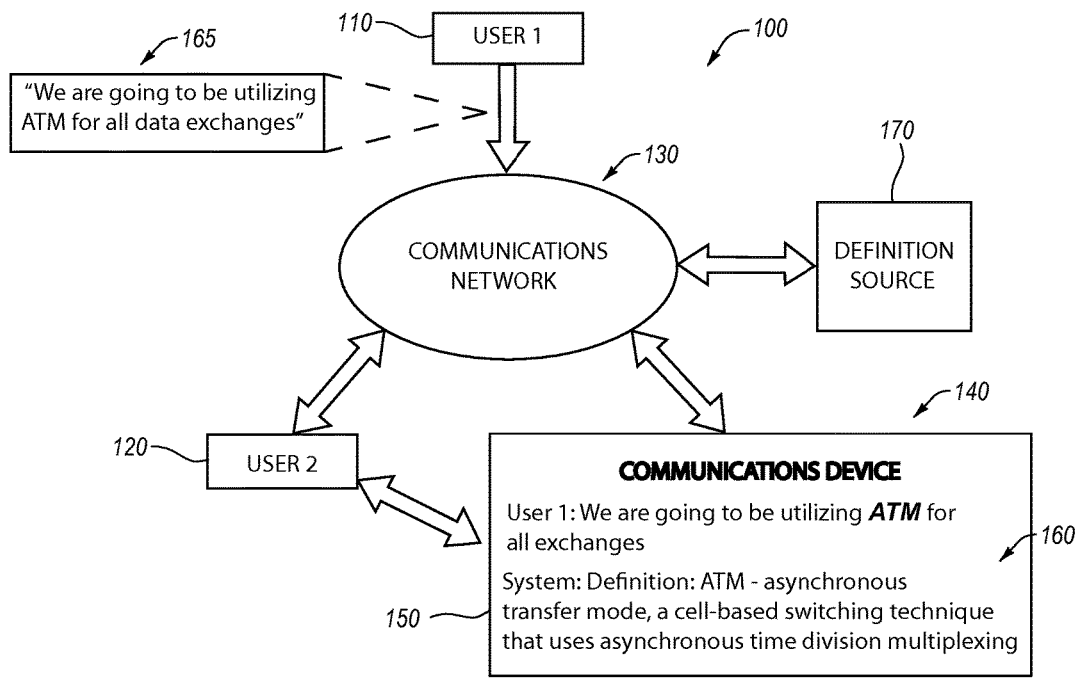
FIG. 1 illustrates a communication system in an exemplary embodiment.

Systems and methods are provided herein for managing conversations over a communications network between a plurality of users using communication devices. In at least one example, the systems and methods allow the users to conduct a conversation in a first channel using the communication devices while allowing the users to find definitions for uncertain or unknown words, terms, acronyms or the like without interrupting the flow of the conversation in the first channel.

In at least one example, the first channel may be a voice channel associated with a voice conversation. More specifically, systems and methods may be provided to flag a selected word, acronym or term on a communications device complete with whatever additional speech is needed to provide context. Then, using the same communications device on which the conversation is being carried out, a user is able to submit a search to a local lexicon, a document depository, an internet search or the like. Further, systems and methods may be provided that allow a selective sidebar with the speaker, or alternatively another participant, to ask for a definition of the word, acronym and/or term. The selective sidebar could be via any non-disruptive mechanism such as instant messaging (IM), email or any mechanism that would not alter the flow of the real-time voice conversation.

In at least one example, if the word, acronym or term is unfamiliar to multiple parties on the telephone discussion, systems and methods may be provided to allow requests for definitions to be coordinated or joined and a single response issued to all of those who desire it. Alternatively, the speaker could be alerted to the fact that multiple parties did not understand and allow the speaker to make a decision whether it is important enough to discuss the word, acronym and/or term via the teleconference or merely respond to the query for a definition to the multiple parties via non-disruptive means.

Systems and methods are also provided for storing the definition to the mechanism and source used to obtain the definition in a local lexicon for future reference. Storing the definition locally may minimize the number of searches that extend beyond a local lexicon over time. This could be particularly useful for words, acronyms and terms that are not used frequently.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates a communications system 100 that is configured to facilitate a conversation between a plurality of users, represented by User 1, 110 and User 2, 120; over a communications network 130. In at least one example, the users 110, 120 may each communicate over the communications network 130 using associated communications devices. It will be appreciated, however, that users may use different communications devices and/or differently configured communications devices.

In the illustrated example, at least User 2 120 has access to a communications device 140 that includes at least a display device 150. User 1 may have access to a similarly configured device or to a differently configured device. As illustrated in FIG. 1, the system 100 is configured to display a transcript 160 of the conversation between the User 1 110 and User 2 120 on the display device 150 of the associated communications device 140.

The transcript 160 includes a plurality of subsets of characters, such as words, acronyms, or any character subset that conveys meaning or understanding to a viewer. For ease of reference, subsets of characters will be described as words, terms and/or acronyms, though it will be appreciated that other subsets of characters are also encompassed by this disclosure.

The transcript 160 may include subsets of characters that are unfamiliar or not well understood by one of the users. For example, FIG. 1 shows User 1 110 as originating a portion of the conversation as represented in a quote box 165. It will be appreciated that the conversation can include audio components, textual components, and/or any other components desired for transmission between the users 110, 120 as part of the conversation. As such, in the example shown in FIG. 1, User 1 110 may be referred to as the speaker, though the conversation may be other than a voice conversation. Accordingly, the words in the quote box 165 may be originated by speaking, such as occurs in a telephone conversation, entered using an input/output device, such as a keyboard or keypad, or by any other method or device currently known or developed in the future.

FIG. 1 illustrates that the transcript 160 for at least a portion of the conversation transmitted over the communications network 130 is displayed on the display device 150 of the communications device 140. In the illustrated example, the system 100 may allow for monitoring of the conversation. Monitoring of the conversation may occur on a client device, on a server device, or some combination of the two. Further, monitoring of the conversation may be responsive to user input, to system intelligence, or some combination of the two. In at least one example, the transcript 160 may be monitored in order to flag or identify unfamiliar subsets of characters, such as unfamiliar words, acronyms, terms, or the like. Further, a definition for the subset of characters may be obtained via a variety of means in near real-time. For example, the system 100 may query a definition source 170 for one or more definition for the subset of characters. The system 100 then causes the communications device 140 to display the definition on the display device 150 associated with the communications device 140.

In the context of FIG. 1, User 1 110 illustratively uses the term "ATM" in the course of the conversation. The term "ATM" is displayed on the display device 150 accessible by User 2 120, and in the context of the transcript 160 as shown. As shown in FIG. 1, the system 100 is able to retrieve a definition from the definition source 170 for the term "ATM" that is most relevant to the conversation based on the context and to display the definition on the display device 150.

By displaying the definition returned from the query of the definition source 170, User 2 120 is able to receive clarification about some aspect of what User 1 110 is intending to convey without interrupting the flow of the conversation between the users 110, 120. One exemplary method for facilitating a conversation will now be discussed in more detail with simultaneous reference to FIG. 2.

Figure 2:
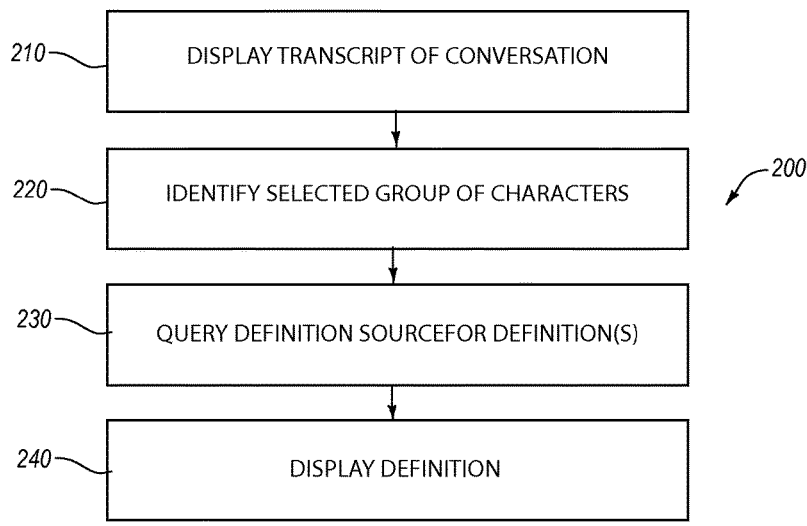
FIG. 2 illustrates a method of operating a communication system in an exemplary embodiment.

FIG. 2 is a flowchart illustrating a method 200 of operating a communication system according to one example. As illustrated in FIG. 2, the method may include at step 210 displaying a transcript of at least a portion of a conversation between a plurality of users. The conversation can include audio elements and/or visual elements as desired. Visual components may include, without limitation, textual conversions of audio elements associated with the conversation. Visual components may alternatively include textual elements received directly as user input as part of the conversation. Accordingly, a transcript can include a plurality of subsets of characters, such as words, terms, acronyms, and/or any other subsets of characters as discussed above. The transcript of the conversation may be displayed on any type of communications device, including the various communication devices and environments discussed in more detail with reference to FIGS. 3 and 4 hereinafter.

Referring still to FIG. 2, the method includes at step 220 identifying an occurrence of at least one selected subset of characters from the plurality of subsets of characters. The selected subset of characters may include words, terms, acronyms, and/or any other subsets of characters that are identified by user input and/or which a system identifies.

User input that identifies a term can be received in any desired manner. For example, user input may be received when a user speaks the subsets of words that are received by a system or device. In other examples, user input may be received from a peripheral device or other input device to select a subset of characters.

As introduced, identifying a selected subset of characters may also be performed by a system. In at least one example, a system may identify a selected subset of characters by comparing the subsets of characters in the conversation to a selected definition source. For example, the system may compare the subsets of characters in the conversation to a readily accessible definition source, such as a definition source within the communications network or other readily accessible definition source. If a definition for the subset of characters is not located in the selected definition source, then the subset of characters may be identified as a selected subset of characters for the purposes of the remaining steps of the present method.

Based on the identification of the subsets of characters through user input and/or system intervention, at step 230 the method continues by querying a definition source for at least one definition for the selected subset of characters. The definition source can include any database or collection of databases including, without limitation, an electronic dictionary, an electronic lexicon, a local document depository system, a centralized document depository system, an internet search, or a viral discovery search of products.

The definition source can also be located in any number of environments, including environments associated with client communications devices, environments that are part of the communications network, with environments accessible by the communications network such as external networks, or with any other environment or combination of environments. For ease of reference, definition sources that are within or part of the communications network may be referred to as internal definition sources while definition sources that are not within or not part of the communications network may be referred to as external definition sources.

As previously introduced, a selected subset of characters may be identified by a system when the system determines a definition for a subset of characters within a conversation is not found in an internal definitions source. In such an example, querying for a definition may further include querying an external definition source since the system will have already determined that a definition for the subset of characters is not found in any internal definition source. Such a method may be performed using automatic system intervention.

If user input is received to identify the selected subset of characters, then querying a definition source for a definition may include first querying the internal definition source. Searching the definition sources within the communication system first may return results more quickly than searching external definition sources, provided, of course, the definition for the selected subset of characters is found in the definition sources within the communication system. If a definition for the selected subset of characters is not found in the definition sources within the communications system, querying the definition sources may then include querying external definition sources. Accordingly, querying a definition source for a definition for the selected subset of words may include searching an internal definition source and/or searching an external definition source.

Querying a definition source for at least one definition may further include identifying adjacent subsets of characters occurring in proximity with the selected subset of characters within the conversation. These adjacent subsets of words may be automatically identified when the selected subset of words is identified or the adjacent subsets of words may be identified by the receiving user input. In either case, the definition source can then be queried for occurrences of the adjacent subsets of characters to determine if the adjacent subsets of characters are found within the definitions returned by the query.

In at least one example, a frequency search of the adjacent subsets of characters may be performed on the definitions returned by the query. If the adjacent subsets of characters are found within a definition returned by the query, the definition returned is likely to be relevant to the conversation and thus more likely to have the meaning intended by the speaker. Accordingly, querying a definition source for a definition for the selected subset of characters may include determining which of the returned definitions are most relevant to the conversation.

The exemplary method shown in FIG. 2 further includes at step 240 displaying the definition for the selected subset of characters. In at least one example, the display of the definitions may be ordered according to the frequencies of the occurrences of the adjacent subsets of characters in the definitions. Accordingly, the method may allow a system to facilitate a conversation using communication devices while allowing the users to find definitions for subsets of characters such as uncertain or unknown words, terms, acronyms and/or the like without interrupting the flow of the conversation.

It will be appreciated that the method shown in FIG. 2 may also include a preliminary step of converting audio signals associated with the conversation into the transcript of the conversation. Such a method may be performed using communication devices configured to facilitate telephone conversations. One such example will be discussed in more detail with reference to FIG. 3.

Figure 3:
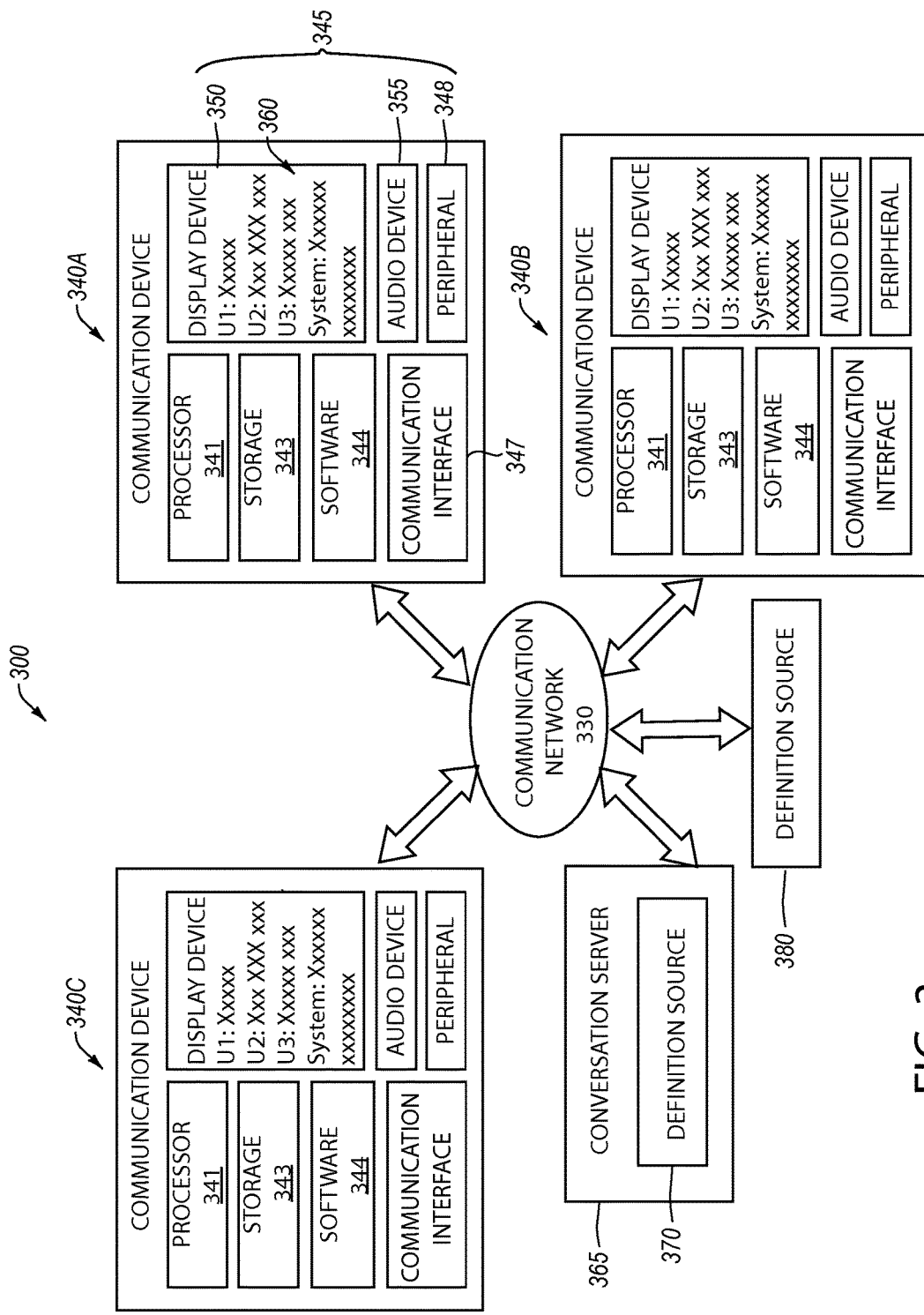
FIG. 3 illustrates a plurality of communication devices in an exemplary embodiment.

FIG. 3 illustrates a communications system 300 that is configured to facilitate conversations between a plurality of users over a communication network 330. In particular, as illustrated in FIG. 3 the communications system 300 includes a plurality of communication devices 340A, 340B, 340C. In the illustrated example, the communication devices 340A, 340B, 340C are configured to support audio transmissions as part of the conversation.

Communication devices 340A, 340B, 340C may be representative of communication devices described above, though any of the foregoing communication devices and/or the following foregoing devices could use alternative configurations. Communication devices 340A, 340B, 340C each include a processor 341, storage system 343, software 344, user interface 345, and communication interface 347. For ease of reference, the configuration of communication device 340A will be the configuration described in detail, though it will be appreciated that the discussion of communication device 340A may be equally applicable to communication devices 340B, 340C. It should be understood that some elements could be omitted. Processor 341 is linked to storage system 343, user interface 345, and communication interface 347. Storage system 343 stores software 344, executable in operation by processor 341.

Communication interface 347 may include a network card, network interface, port, or interface circuitry that allows the communications devices 340A, 340B, 340C to communicate with each other and other communication devices over a variety of networks, such as the communication network 330. Communication interface 347 may also include a memory device, software, processing circuitry, or some other device. Communication interface 347 may use various communication protocols, such as time division multiplex, internet, Ethernet, wireless, or some other communication format—including combinations thereof—to exchange communications as described herein as part of conversations.

User interface 345 comprises components that interact with a user to receive user inputs and user communications and to present media and/or information. User interface 345 may include a speaker, microphone, buttons, lights, display screen, mouse, keyboard, or some other user input/output apparatus—including combinations thereof.

In the illustrated example, the user interface 345 includes peripheral device 348, visual device 350, and audio device 355. Peripheral device 348 may be any device that can receive or output user communications, such as a keyboard, mouse, function buttons, joysticks or multi-button equivalents, and/or touch screens or the like. Regardless of the specific configuration utilized, the peripheral device 348 may be configured to identify selected subsets of words from a transcript 360 of a conversation facilitated by the communication devices 340A, 340B, 340C.

Likewise, audio device 355 is any device capable of receiving or outputting user communications, such as voice communications. Examples of audio device 355 include speakers, headphones, earphones, and microphones. Visual device 350 is any device capable of displaying images to a user. An example of a visual device 350 is a display screen.

Processor 341 may comprise a microprocessor and other circuitry that retrieves and executes software 344 from storage system 343. Storage system 343 comprises a disk drive, flash drive, data storage circuitry, or some other memory apparatus. Processing system 341 is typically mounted on a circuit board that may also hold storage system 343 and portions of communication interface 347 and user interface 345.

Software 344 comprises computer programs, firmware, or some other form of machine-readable processing instructions. Software 344 may include an operating system, utilities, drivers, network interfaces, applications, virtual machines, or some other type of software. When executed by processing system 341, software 344 directs processing system 341 to operate communication device 340A to perform processes described herein with communication devices.

As shown in FIG. 3, the communication system 300 may also include a conversation server 365. The conversation server 365 may be configured to perform any or all of the processes described above with reference to FIG. 2 as desired. Further, the conversation server 365 may be part of the communications network 330 or may be configured to access the communications network 330 as desired.

In the example shown, an internal definition source 370 is associated with the conversation server 365. The internal definition source 370 may be part of the communication network 330 and/or part of the conversation server 365 as desired. In at least one example, the system 300 may be configured to access an external definition source 380 as desired. As will be described in more detail below, the communication system 300 is configured to facilitate a conversation between users via the communication devices 340A, 340B, 340C using the audio devices 355 as a first channel.

In the illustrated example, speech from the users is sent by the communication devices 340A, 340B, 340C over the communication network 330 to the conversation server 365. The speech signals are thus received by the conversation server 365. The conversation server 365 processes the speech to generate the transcript 360. The conversation server 365 then transmits the transcript to the communication devices 340A, 340B, 340C. The transcript 360 of the conversation may be displayed on each of the display devices 350 of the communication devices 340A, 340B, 340C. In other examples, the speech may be converted to text by the communication devices 340A, 340B, and 340C as desired.

In one exemplary embodiment, in order to initiate use of the system 300, a user selects a telephony feature during calls that causes the transcript 360 based on Automatic Speech Recognition (ASR) to be scrolled across the display devices 350 of the communications devices 340A, 340B, 340C. In at least one example, as the transcript 360 is scrolled across the display device 350, users may select a subset of characters for which they desire a definition.

In particular, one or more of the communication devices 340A, 340B, 340C may receive input through the associated peripheral 348 to indicate a subset of characters for which the user desires a definition. In at least one example, the user input that is received may excerpt a single subset of characters, such as a single word, term, or acronym. In other examples, the user input that is received may selectively submit subsets of characters preceding and/or subsets of characters following the desired unknown subset of characters to one of the definition sources 370, 380 to provide context if desired. The word, acronym and/or term selected may be submitted as a search to one or more of the definition sources 370, 380.

The definition sources 370, 380 may include, but are not limited to, an electronic dictionary or lexicon, a local or centralized document depository system, an internet search, a request of another participant for a definition, and/or a viral discovery search of projects, products or the like. The selected search may start with local resources where a definition can be returned with the least latency and progress to more time intensive search means. In order to make the search more efficient, user input may be received to indicate a "use context" such as work, personal, hobbies, organizations, areas of expertise and the like. This could also help to solve the problem of multiple definitions of a single word, acronym or term.

Other ways of providing context are also possible. For example, context may be provided by way of a tag or other such indicator generated and stored by an information system. For example, conversation server 365 may access information pertaining to the conversation that is generated without input by the user, such as the business division of each of the participants, the technical field of each of the participants, the identify of business entities represented in the conversation, or the like. The information may be stored internally to conversation server 365, or externally in other systems or databases. In fact, in some embodiments the context of the conversation may be determined based on these above mentioned factors, and then the definition source selected based on the determined context. In this manner, the search may be made more efficient by identifying from tagged information the context of the conversation, and the selecting a proper definition source accordingly.

In another exemplary embodiment, the user does not need to manually select a subset of characters. Instead, subsets of characters that are currently present in the internal definition source 370 are filtered and only net new subsets of characters are presented to the display devices 350 associated with each of the communication devices 340A, 340B, 340C. In such a way, searches can be done automatically without user intervention and stored in a definition source 370, 380. User input can be received through the peripheral 348 to selectively highlight or queue such searches so that the results of the searches are returned in temporal sequence, in order of importance to comprehension or any other user defined order.

In another exemplary embodiment, the communications devices 340A, 340B, 340C may be configured to receive input through the peripheral 348 to flag a selected portion of transcript 360 and selectively send the selected portion to another participant in the conversation via the other communication devices 340A, 340B, 340C to request a definition.

The transmission of the selected portion of the transcript 360 may preferably be done by non-disruptive means such as instant message (IM), email, or the like so that it does not impede the natural flow of the conversation occurring between the other users. In such an embodiment, the communication system 300 would be able to correlate multiple requests for a definition and either coordinate a single response to multiple users or alternatively notify the speaker that multiple parties do not understand and allow real time discussion, if desired, to clarify.

In at least one example, once the selected subset of characters has been identified and queried as described above, the definition(s) returned by the query are displayed on the display devices 350 of any number of the communication devices 340A, 340B, 340C involved in the conversation. If the definition is returned from the external definition source 380, the conversation server 365 may cause the definition to be stored in the internal definition source 370. Storing the definitions on the internal definition source 370 may make future searches for the subset of characters quicker and/or more relevant.

In at least one exemplary embodiment, the system 300 can correlate what subsets of characters are stored by other participants according to which subsets of characters are queried in the definition sources 370, 380. The system 300 may be further configured to retrieve the definition based on a trust-based relationship with the other user such that the type of searches described above may be omitted. Such a network of definitions could be linked in a structure using artificial intelligence, machine learning and the like to minimize the number of searches performed across an enterprise or other organization. In still another exemplary embodiment, the system 300 may be configured to push or request a download of another system user's current definition source to allow a new user to jump start their understanding.

Figure 4:
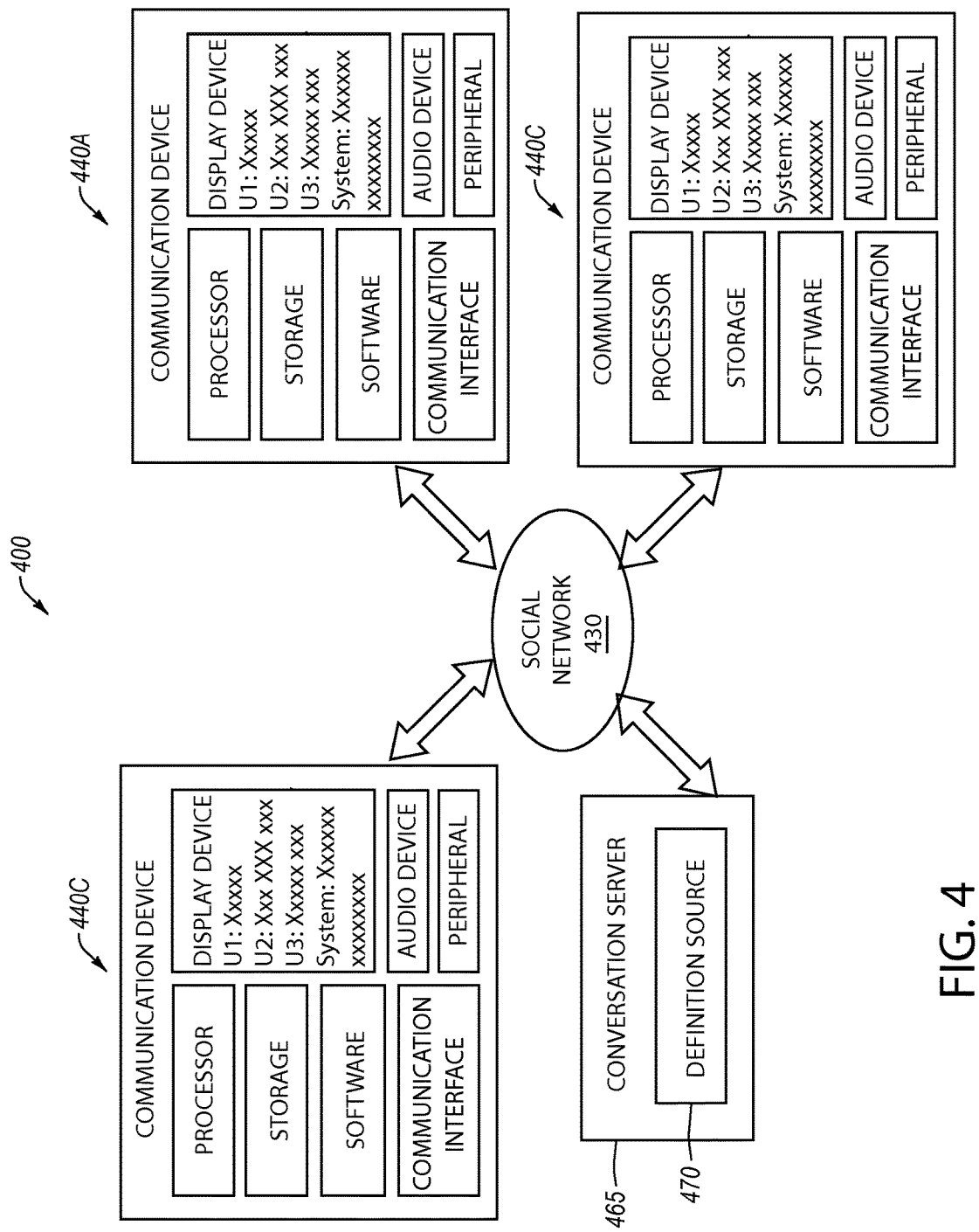
FIG. 4 illustrates a communication system in an exemplary embodiment.

As previously introduced, the systems and method described above may be implemented in a variety of environments. It will also be appreciated that the methods and systems may be implemented at a variety of levels. For example, FIG. 4 shows a system 400 for facilitating conversation over a Social Network 430. In such an example, the system 400 may be configured to couple parties associated via communication devices 440A, 440B, 440C by a context. The context may be identified in a number of ways, such as by tagged information about the parties that is generated and stored prior to the conversation. Implementing the system 400 at the level of the Social Network 430 may allow a lexicon of subsets of characters, such as internal definition source 470 residing on conversation server 465, that are not common parlance except within the confines of the Social Network 430, to be stored efficiently and without duplication for each user. In addition, such a configuration may allow parties who are newly added to the Social Network 430 to have the ability to understand otherwise unfamiliar words, acronyms and/or terms.

As is apparent to one schooled in this art, additional variations on this basic invention are possible without departing from the claim scope intended. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above but only by the following claims and their equivalents.

What is claimed is:

1. A method of operating a communication system, comprising:
   generating a transcript of at least a portion of a conversation between a plurality of users, the transcript including a plurality of subsets of characters;
   displaying the transcript on a plurality of communication devices;
   identifying an occurrence of at least one selected subset of characters from the plurality of subsets of characters;
   determining a context of the conversation from subsets of the plurality of subsets of characters other than the at least one selected subset;
   selecting a definition source from a plurality of definition sources based at least in part on the determined context, wherein the plurality of definition sources each comprise one or more databases;
   in response to selecting the definition source, querying the definition source for to obtain definitions for the selected subset of characters;
   identifying adjacent subsets of characters occurring in proximity with the selected subset of characters in the transcript;
   determining a frequency of occurrences of the adjacent subsets of the characters within each of the definitions;
   organizing the definitions based on the frequency of occurrences of the adjacent subsets of characters; and
   displaying the organized definitions for the selected subset of characters on the plurality of communication devices.

2. The method of claim 1, wherein identifying the at least one selected subset of characters includes receiving user input to identify the at least one selected subset of characters.

3. The method of claim 1, wherein identifying the at least one selected subset of characters includes comparing the plurality of subsets of characters in the conversation to the definition source to identify subsets of characters not defined in the definition source.

4. The method of claim 3, further comprising querying a database external to the definition source for definitions of the subsets of characters not defined in the definition source.

5. The method of claim 4, further comprising adding to the definition source definitions returned by querying the database external to the definition source.

6. The method of claim 3, wherein the conversation occurs within a social network.

7. The method of claim 1, wherein identifying the occurrence of the selected subset of characters includes identifying an acronym.

8. The method of claim 1, wherein the definition source includes at least one of an electronic dictionary, an electronic lexicon, a local document depository system, a centralized document depository system, an internet search, or a viral discovery search of products.

9. The method of claim 1, wherein identifying the occurrence of at least one selected subset of characters from the plurality of subsets of characters and querying the definition source for the definitions for the selected subset of characters occurs prior to the step of displaying the organized definitions for the selected subset of characters on the plurality of communication devices.

10. The method of claim 1, further comprising determining if the selected subset of characters has been identified by more than one user, and responsive to determining that the selected subset of characters has been identified by more than one user, sending a notification to a user who originated the selected subset of characters.

11. The method of claim 10, wherein sending the notification to the user who originated the selected subset of characters includes sending the notification through non-disruptive means.

12. A communication system, comprising:
 a server configured to generate a transcript of at least a portion of a conversation between a plurality of users over a network, the transcript including a plurality of subsets of characters; and
 a plurality of communication devices configured to receive the transcript from the server and to display the transcript, wherein at least one of the communication devices is configured to receive input to identify an occurrence of at least one selected subset of characters from the plurality of subsets of characters;
 wherein the server is further configured to determine a context of the conversation from subsets of the plurality of subsets of characters other than the at least one selected subset;
 wherein the server is further configured to select a definition source from a plurality of definition sources based at least in part on the determined context, wherein the plurality of definition sources each comprise one or more databases;
 wherein the server is further configured to, in response to selecting the definition source, query the definition source to obtain definitions for the selected subset of characters;
 wherein the server is further configured to identify adjacent subsets of characters occurring in proximity with the selected subset of characters in the transcript;
 wherein the server is further configured to determine a frequency of occurrences of the adjacent subsets of the characters within each of the definitions;
 wherein the server is further configured to organize the definitions based on the frequency of occurrences of the adjacent subsets of characters; and
 wherein the plurality of communication devices are configured to display the organized definitions for the selected subset of characters.

13. The system of claim 12, wherein the definition source includes an internal definition source associated with the server.

14. The system of claim 13, wherein the server is further configured to query an external definition source for the definition for the selected subset of characters.

15. The system of claim 13, wherein the server queries the definition source for the definitions for the selected subset of characters prior to the communication devices displaying the organized definitions for the selected subset of characters on the plurality of communication devices.

16. A non-transitory computer readable medium having instructions stored thereon, that when executed perform a method, the method comprising the steps of:
 generating a transcript of at least a portion of a conversation between a plurality of users, the transcript including a plurality of subsets of characters;
 displaying the transcript on a plurality of communication devices;
 identifying an occurrence of at least one selected subset of characters from the plurality of subsets of characters;
 determining a context of the conversation from subsets of the plurality of subsets of characters other than the at least one selected subset;
 selecting a definition source from a plurality of definition sources based at least in part on the determined context, wherein the plurality of definition sources each comprise one or more databases;
 in response to selecting the definition source, querying the definition source for to obtain definitions for the selected subset of characters;
 identifying adjacent subsets of characters occurring in proximity with the selected subset of characters in the transcript;
 determining a frequency of occurrences of the adjacent subsets of the characters within each of the definitions;
 organizing the definitions based on the frequency of occurrences of the adjacent subsets of characters; and
 displaying the organized definitions for the selected subset of characters on the plurality of communication devices.

17. The computer readable medium of claim of claim 16, further comprising instructions which cause a processing device to determine if the selected subset of characters has been identified by more than one user, and responsive to determining that the selected subset of characters has been identified by more than one user, sending a notification to a user who originated the selected subset of characters.

18. The system of claim 12, wherein the server is further configured to determine if the selected subset of characters has been identified by more than one user, and responsive to determining that the selected subset of characters has been identified by more than one user, sending a notification to a user who originated the selected subset of characters.

* * * * *

UNITED STATES PATENT AND TRADEMARK OFFICE
CERTIFICATE OF CORRECTION

| | |
|---|---|
| PATENT NO. | : 9,852,732 B2 |
| APPLICATION NO. | : 12/899683 |
| DATED | : December 26, 2017 |
| INVENTOR(S) | : David L. Chavez and Larry J. Hardouin |

It is certified that error appears in the above-identified patent and that said Letters Patent is hereby corrected as shown below:

In the Claims

Column 10, Claim 1, Line 19: delete "source for to obtain" and insert --source to obtain--

Column 12, Claim 16, Line 24: delete "source for to obtain" and insert --source to obtain--

Signed and Sealed this
Twenty-first Day of February, 2023

*Katherine Kelly Vidal*

Katherine Kelly Vidal
*Director of the United States Patent and Trademark Office*